No. 885,197. PATENTED APR. 21, 1908.
F. A. STEVENS.
EYEGLASSES.
APPLICATION FILED APR. 26, 1907.
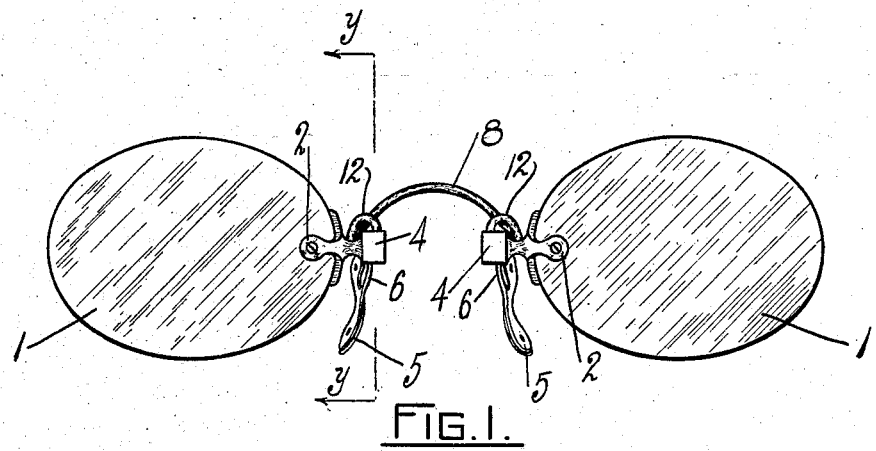
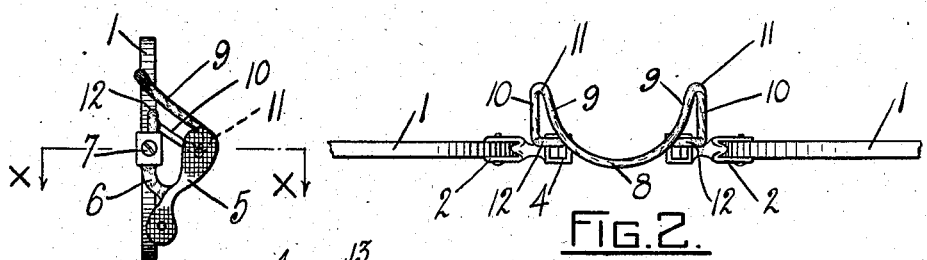
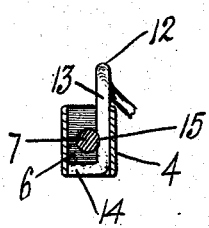
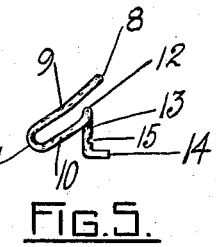
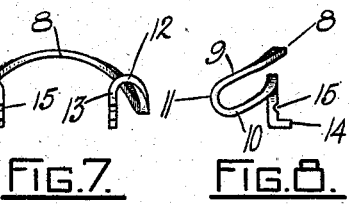
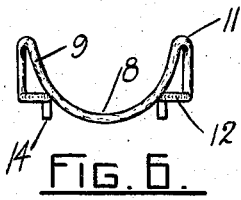
WITNESSES.
A.G. Pieczentkowski.
Walter E. Goodwin.
INVENTOR
Frederick A. Stevens
By Horatio E. Bellows
ATTORNEY.

UNITED STATES PATENT OFFICE.

FREDERICK A. STEVENS, OF PROVIDENCE, RHODE ISLAND.

EYEGLASSES.

No. 885,197.

Specification of Letters Patent.

Patented April 21, 1908.

Application filed April 26, 1907. Serial No. 370,366.

*To all whom it may concern:*

Be it known that I, FREDERICK A. STEVENS, a citizen of the United States, residing at Providence, in the county of Providence and State of Rhode Island, have invented certain new and useful Improvements in Eyeglasses, of which the following is a specification, reference being had therein to the accompanying drawing.
My invention relates to springs for eyeglasses and its essential objects are to lessen the pupillary distance between the lenses while proportionately increasing the space between the rearwardly inclined loops or bends whereby the spring may clear the nose guards; to increase the resiliency of the spring; to make the structure symmetrical; to produce a spring so shaped as to intimately contact with the nose; and to form and locate the ends of the spring so as to prevent any play between and adjacent the attaching parts.

Other novel purposes and constructions will be hereinafter pointed out and claimed.
To the above ends essentially my invention consists in the novel construction and combination of parts and features hereinafter set forth, and illustrated in the accompanying drawings, wherein, Figure 1 is a front elevation of a pair of eyeglasses embodying my invention. Fig. 2, a top plan view of the same. Fig. 3, a central transverse section thereof. Figs. 4, 5 and 6, front, edge and plan elevations respectively of the spring member. Figs. 7, 8 and 9, like elevations respectively of the same constructed of flat stock. Fig. 10, a section of the box on line $x$ $x$ of Fig. 3, and Fig. 11, a section of the same on line $y$ $y$ of Fig. 1.

Like reference characters indicate like parts throughout the views.

My invention is disclosed in conjunction with a pair of eyeglasses comprising the usual lenses, 1, straps, 2, boxes, 4, guards, 5, guard arms, 6, and attaching screws or pins, 7.

The bridge or spring comprises an arched central portion, 8, inclined downwardly and rearwardly as at 9, to insure the contact of the arched portion of the spring with the wearer's nose. The inclined portions, 9, are then bent upwardly and forwardly as at 10, whereby is formed a loop, 11, downwardly inclined with relation to the lenses and wholly in the rear thereof. The loops terminate at a point not higher than the plane of the screw, 7, or other attaching device. It will be noted that while arched portions, 9, and rectilinear portions, 10, of the inclined loops are one above the other, yet they are not in the same vertical planes. The rectilinear portions, 10, extend to the plane of the lenses, where they are upwardly, inwardly and downwardly bent, forming bends or loops, 12, above the boxes, 4, which lie substantially in the plane of the lenses. The downwardly extending portions, 13, of the spring enter the boxes, 4, and extend downwardly along the walls thereof, and are then bent at right angles forming the ends or projections, 14. The vertical portions, 13, are provided with cavities, 15, in their sides through which pass the screws, 7, which also traverse the guard arms, 6, and presses the portion, 13, against the inner wall of the box. The end of the projection, 14, bears against the opposite wall of the box whereby any play of the spring is prevented. The attaching means might be otherwise constructed or arranged to secure the results sought, but the above is the preferred construction.

The material of the spring is circular in cross section, but the construction is such that it lends itself advantageously to the use of flat or rectangular material as shown in Figs. 7, 8 and 9.

It will be observed that the bends or loops, 11, are outside the attaching points whereby interference with the top of the guard is obviated regardless of any position which the lenses may assume; further, that the loops or bends, 12, permit the employment of a maximum of material whereby the resiliency of the spring is increased.

What I claim is,

1. In eyeglasses, the combination with the lenses and the attaching devices for the bridge spring, of a bridge spring connecting the lenses and extending rearwardly and downwardly and thence upwardly and forwardly to form bends wholly in the rear of the lenses, and intermediate loops with the terminals of the spring substantially in the plane of the lenses the intermediate loops being inclined downwardly with relation to the lenses.

2. In eyeglasses, the combination with the lenses and the attaching devices for the bridge spring, of a bridge spring connecting the lenses and extending rearwardly and downwardly and thence upwardly and forwardly to form bends wholly in the rear of the lenses, and intermediate hooks with the terminals of the spring substantially in the plane of the lenses, the arched portion of said spring being inclined downwardly and rearwardly the intermediate loops being inclined downwardly with relation to the lenses.

3. In eyeglasses, the combination with the lenses and boxes, of a bridge spring comprising an inclined intermediate portion extending downwardly and upwardly to form bends at the rear of and above the boxes, and intermediate loops inclined downwardly with relation to the lenses and wholly in the rear thereof.

4. In eyeglasses, the combination with the lenses and boxes, of a bridge spring comprising an inclined intermediate portion extending downwardly and upwardly to form bends at the rear of and above the boxes, and intermediate loops inclined downwardly with relation to the lenses and wholly in the rear thereof, the said bends lying in the plane of the lenses.

5. In eyeglasses, the combination with the lenses and boxes and attaching devices for the bridge spring, of a bridge spring provided with an inclined intermediate portion extended downwardly and upwardly to form bends in the rear of the boxes and the rearward bends upon each end terminating substantially in the plane of the attaching devices and continued to form inwardly directed bends lying substantially in the plane of the lenses.

6. In eyeglasses, the combination with the lenses and boxes and attaching devices, of a bridge spring provided on both sides of its center with downwardly inclined loops wholly to the rear of the attaching devices and with bends lying in different planes from said loops, one of said bends being at the rear of the boxes and substantially in the plane of the lenses.

7. In eyeglasses, the combination with the lenses and boxes and attaching devices, of a bridge spring provided on both sides of its center with downwardly inclined loops wholly to the rear of the attaching devices and with bends lying in different planes from said loops, one of said bends being at the rear of the boxes and substantially in the plane of the lenses, said loops being wholly in the rear of the lenses.

8. In eyeglasses, the combination with the lenses and boxes and attaching devices for the bridge spring, of a bridge spring having an intermediate portion extending downwardly and upwardly to form bends in the rear of the boxes and the rearward bends upon each end continued to form bends substantially in the plane of the lenses, the ends of said spring having right angular projections, the vertical portions of which bear against the inner walls of the boxes.

9. In eyeglasses, the combination with the lenses and boxes and attaching devices for the bridge spring, of a bridge spring having an intermediate portion extending downwardly and upwardly to form bends in the rear of the boxes and the rearward bends upon each end continued to form bends substantially in the plane of the lenses, the ends of said spring having right angular projections, the vertical portions of which bear against the inner walls of the boxes and provided with cavities, boxes and pins traversing the boxes and engaged in said cavities.

In testimony whereof I have affixed my signature in presence of two witnesses.

FREDERICK A. STEVENS.

Witnesses:
 HORATIO E. BELLOWS,
 WALTER E. GOODWIN.